(12) United States Patent
Holcomb et al.

(10) Patent No.: US 7,264,189 B2
(45) Date of Patent: Sep. 4, 2007

(54) HAND-HELD FOOD PROCESSOR

(75) Inventors: David A. Holcomb, Seattle, WA (US); Joshua R. Stewart, Seattle, WA (US)

(73) Assignee: Chef'n Corporation, Seattle, WA (US)

( * ) Notice: Subject to any disclaimer, the term of this patent is extended or adjusted under 35 U.S.C. 154(b) by 0 days.

(21) Appl. No.: 11/361,061

(22) Filed: Feb. 23, 2006

(65) Prior Publication Data

US 2006/0169810 A1 Aug. 3, 2006

Related U.S. Application Data

(62) Division of application No. 09/839,027, filed on Apr. 19, 2001.

(51) Int. Cl.
*A47J 43/046* (2006.01)

(52) U.S. Cl. .............................. 241/101.1; 241/169.1; 241/282.2; 99/584; 99/628

(58) Field of Classification Search ............... 99/628, 99/540, 584, 623, 629, 634, 588, 510; 241/101.1, 241/282.1, 282.2, 199.12, 169.1
See application file for complete search history.

(56) References Cited

U.S. PATENT DOCUMENTS

| | | | |
|---|---|---|---|
| 507,903 A | 10/1893 | Hancock |
| 1,194,318 A | 8/1916 | Power |
| 1,511,287 A | 10/1924 | Lindley |
| 1,619,550 A | 3/1927 | Thebaud et al. |
| 2,246,054 A | 6/1941 | Marty |
| 2,347,383 A | 4/1944 | Wiegratz |
| 2,407,819 A | 9/1946 | Donlan, II |
| 2,592,481 A | 4/1952 | Spencer et al. |
| 2,796,987 A | 6/1957 | Meyer |
| 3,123,114 A | 3/1964 | Andrews et al. |
| 3,156,278 A | 11/1964 | Otto |
| 3,581,790 A | 6/1971 | Del Conte |
| 3,990,358 A | 11/1976 | Cade |
| 4,007,751 A | 2/1977 | Commiant |
| 4,124,310 A | 11/1978 | Brackman et al. |
| 4,442,764 A | 4/1984 | Bos et al. |
| 4,682,740 A | 7/1987 | Conigliaro et al. |
| 4,768,429 A | 9/1988 | Federighi |
| 4,905,465 A | 3/1990 | Jones et al. |
| D315,657 S | 3/1991 | Ruttimann |

(Continued)

FOREIGN PATENT DOCUMENTS

FR    1 012 262 A    7/1952

(Continued)

*Primary Examiner*—Mark Rosenbaum
(74) *Attorney, Agent, or Firm*—Seed IP Law Group PLLC

(57) ABSTRACT

A hand-held hand-powered food processor having a pull cord motor for rotating a spindle that carries an arm. The arm can be a cutter blade or an elastomeric flexible peeler arm having a durometer of preferable between Shore 80A and Shore 82A. A food processor having a spindle, an elastomeric arm driven by the spindle, a stop block on a sidewall near the end of the arm, and a drive for rotating the spindle to rub against the skin of food in the processor for peeling the food. The cover of the processor has a flat outer periphery so the cover can be used as a storage unit for the contents of the processor.

34 Claims, 5 Drawing Sheets

U.S. PATENT DOCUMENTS

| | | |
|---|---|---|
| 5,245,726 A | 9/1993 | Rote et al. |
| 5,360,170 A | 11/1994 | Cartellone |
| 5,401,159 A | 3/1995 | Hsu |
| 5,435,237 A | 7/1995 | Huang |
| 5,617,783 A | 4/1997 | Beeler |
| 5,735,193 A | 4/1998 | Chang |
| 5,782,416 A | 7/1998 | Nejatbina |
| D396,992 S | 8/1998 | Lallemand |
| 5,823,672 A | 10/1998 | Barker |
| 5,960,709 A | 10/1999 | Yip |
| 5,996,483 A | 12/1999 | Yip |
| 6,000,650 A | 12/1999 | Penaranda et al. |
| 6,035,771 A | 3/2000 | Conran et al. |

FOREIGN PATENT DOCUMENTS

| | | |
|---|---|---|
| FR | 2 713 069 A1 | 6/1995 |
| JP | 57-26670 | 6/1982 |
| JP | 62-100989 | 6/1987 |
| JP | 2-46276 | 2/1990 |
| JP | 3022041 | 3/1996 |
| JP | 10-174647 | 6/1998 |

HAND-HELD FOOD PROCESSOR

This application is a division of U.S. Ser. No. 09/839,027 filed Apr. 19, 2001.

TECHNICAL FIELD

A hand-held, hand-powered food processor, such as, a chopper, peeler, mixer or a combination of any of the foregoing and a unique drive for such a hand-held food processor. A peeler for garlic or like food products.

BACKGROUND OF THE INVENTION

Hand-held, hand-powered food processors are known and all basically rotate a spindle to which is connected some form of cutting, beating, or mixing arms. Some of these processors use a hand crank for the drive to rotate the spindle. The Yip patent 5,996,483 is an example. These types of drives for the spindle are often expensive, lack torque, or do not give a long enough pulse of rotation to the spindle for effective action on the food to be processed. Thus, it is one feature of this invention to provide a unique drive for rotating the spindle of a hand-held food processor.

The Yip patent, mentioned above, shows a garlic peeling and peanut shelling processor that uses a rigid beater to throw garlic at a series of vertical ribs spaced along the circumference of a retaining cylinder to break the skin of the garlic.

SUMMARY OF THE INVENTION

This invention is directed to a hand-held hand-powered food processor. In some embodiments the processor can have a peeler arm. In other embodiments the processor can have a chopper blade. The chopper blade embodiment can also mix and emulsify salad dressings in a convenient manner. It is an advantage of this hand-held hand-powered processor that small amounts of food can be processed for small or individual servings as compared to an electric table top food processor designed for large quantities of food to be processed. The hand-held hand-powered food processor can have interchangeable arms or blades thus being converted from a peeler to a chopper or mixer. In any embodiment it is a unique feature of the invention to drive the spindle of the processor with a pull-motor of a type similar to the starter motor on a model airplane or an outboard motor. The pull-motor has been found to uniquely provide a long pulse of rotational power to the spindle [several full rotations] all at a high torque. Thus, with one long pull of the pull-motor cord, the spindle of the hand-held food processor can exert a long and high torque rotational force on the spindle. This long pulse and high torque is particularly advantageous for chopping vegetables or peeling garlic and the drive is accomplished without the need or expense of batteries.

Another feature of the invention is a garlic peeler that is usable in the hand-held hand-powered food processor, battery powered processor, or can be used in a larger table top electrically powered food processor. Basically this peeler utilizes at least one and preferably two elastomeric flexible arms or rods that engage the garlic cloves to be peeled and rub the skin off the garlic clove. In one embodiment a long rib is used to hold the garlic as it is peeled. A stop block keeps the garlic from spinning around with the rotary arms. By rubbing the skin off the garlic, the peeled garlic clove is left in a solid condition afterward making it more attractive for use in cooking.

Another feature is the use of the cover in a hand-held food processor as a collection dish for the food products in the processor and for holding the food products on a table or counter top.

DETAILED DESCRIPTION OF THE INVENTION

A hand-held hand-powered food processor 10, includes an axial end cup or food holder 12 fitted in an axial end housing 14. While the description of the details of the invention will be described with reference to a hand-held, hand-powered food processor, it should be understood that the peeler version of the invention may also be used advantageously as a separate device for use in larger electrically powered table top food processors.

Figure 1:
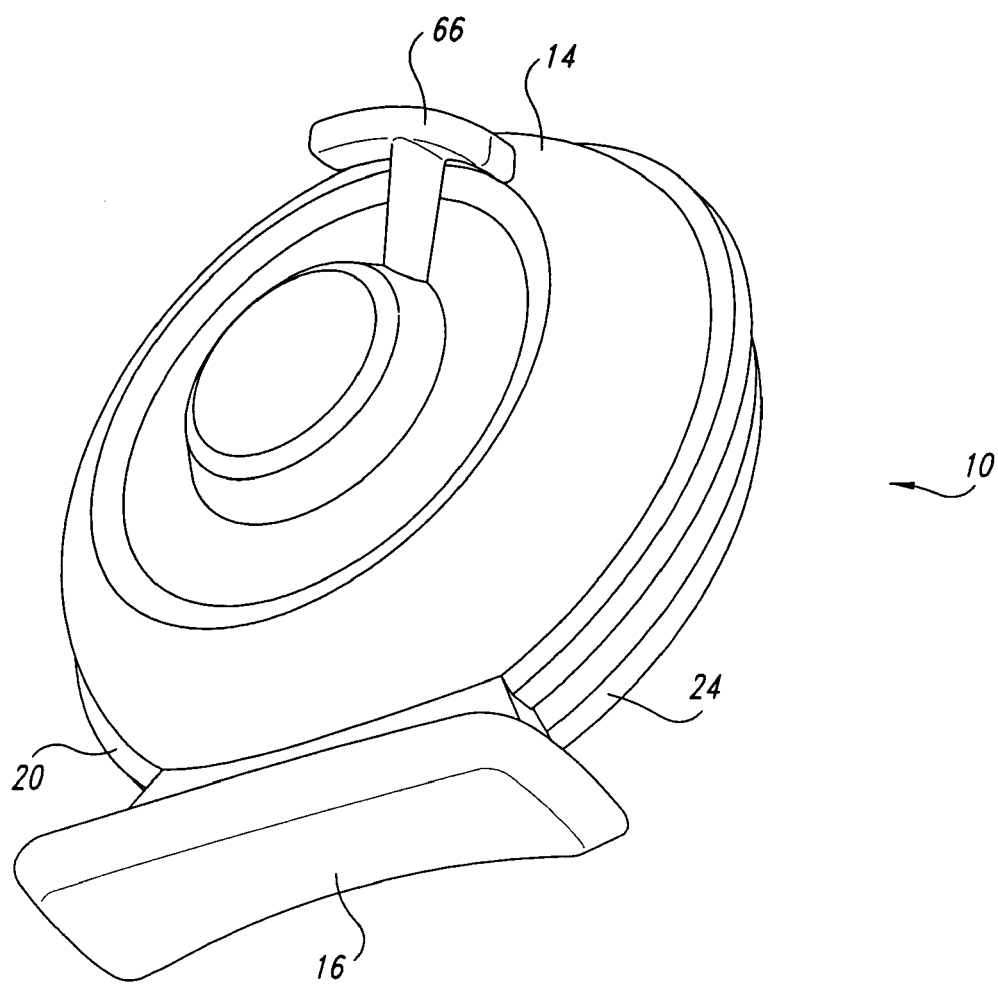
FIG. 1 is an isometric view of a hand-held hand-powered food processor.
Figure 2:
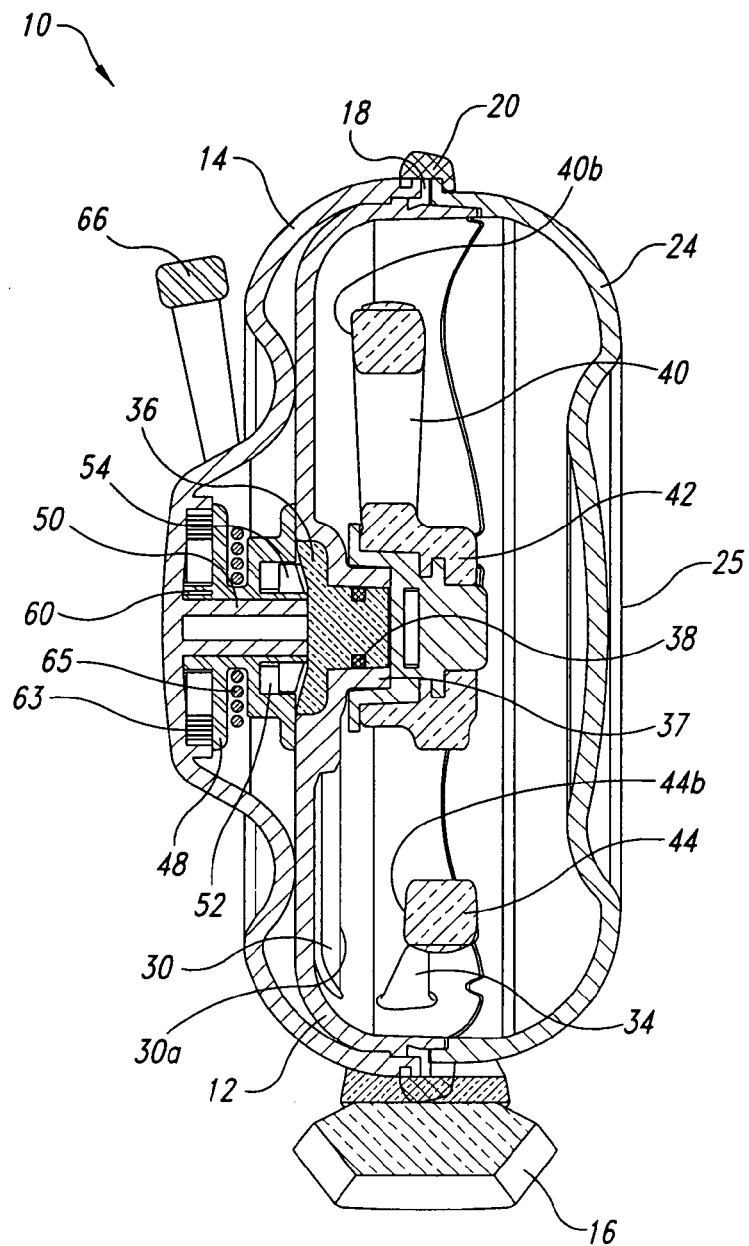
FIG. 2 is an axial cross section of the food processor shown in FIG. 1.

A palm grip or table support member 16 is attached to the end housing 14. The support member is made of rubber and can either be held in the palm of the hand when the processor is being held only in the hands or can be rested on a table or counter when the processor is used in the upright position as shown in FIG. 2. The end housing is formed with a gasket 18 and a locking collar 20. The food holder 12, gasket and locking collar are all bonded together. The locking collar has locking slots 22 that mesh with ribs 23 on a cover 24. The cover is thus attached and sealed by inserting the locking ribs into the locking slots and giving a relative twist between the cover and the end housing in a well-known manner. The food holder has an end surface 28 and a sidewall 32. A long rib 30 is formed on the end surface. A small stop block 34 is attached to the sidewall. When the processor is held with the support member down as in FIGS. 2 and 5, it can be seen that the rib 30 and stop block 34 are both positioned near the vertical center line of the cup. This allows food in the processor to accumulate by gravity over the stop block and adjacent the long rib to enhance contact between the arm 40 (described below) and the food in the cup 12. The food is thus subjected to more shearing action between the arm when the arm is a chopper (as described below) or more peeling action when the arm is a peeling arm (also described below). The preferred position for use of the processor is thus as shown in FIG. 2 but the processor can also be held in other positions. A drive shaft 36 extends through a collar 37 fixed to the end surface of the food holder and is sealed with an o-ring 38. The drive shaft has a radial right angle notch 43. The hub has a key 45 that fits into the notch and is thus drivingly but removably connected to the drive shaft.

The cover 24 also has a uniform outer periphery 25 which serves as a base to support the cover on a table or counter top when the cover is removed from the food processor. In this manner chopped foods, peeled garlic, or blended liquid dressings can be deposited into the cover by removing the cover from an underside or bottom position on the processor. Thus the contents of the processor will fall down into the cover which can then be removed and placed on the table or counter top for holding the contents of the processor.

Figure 3:
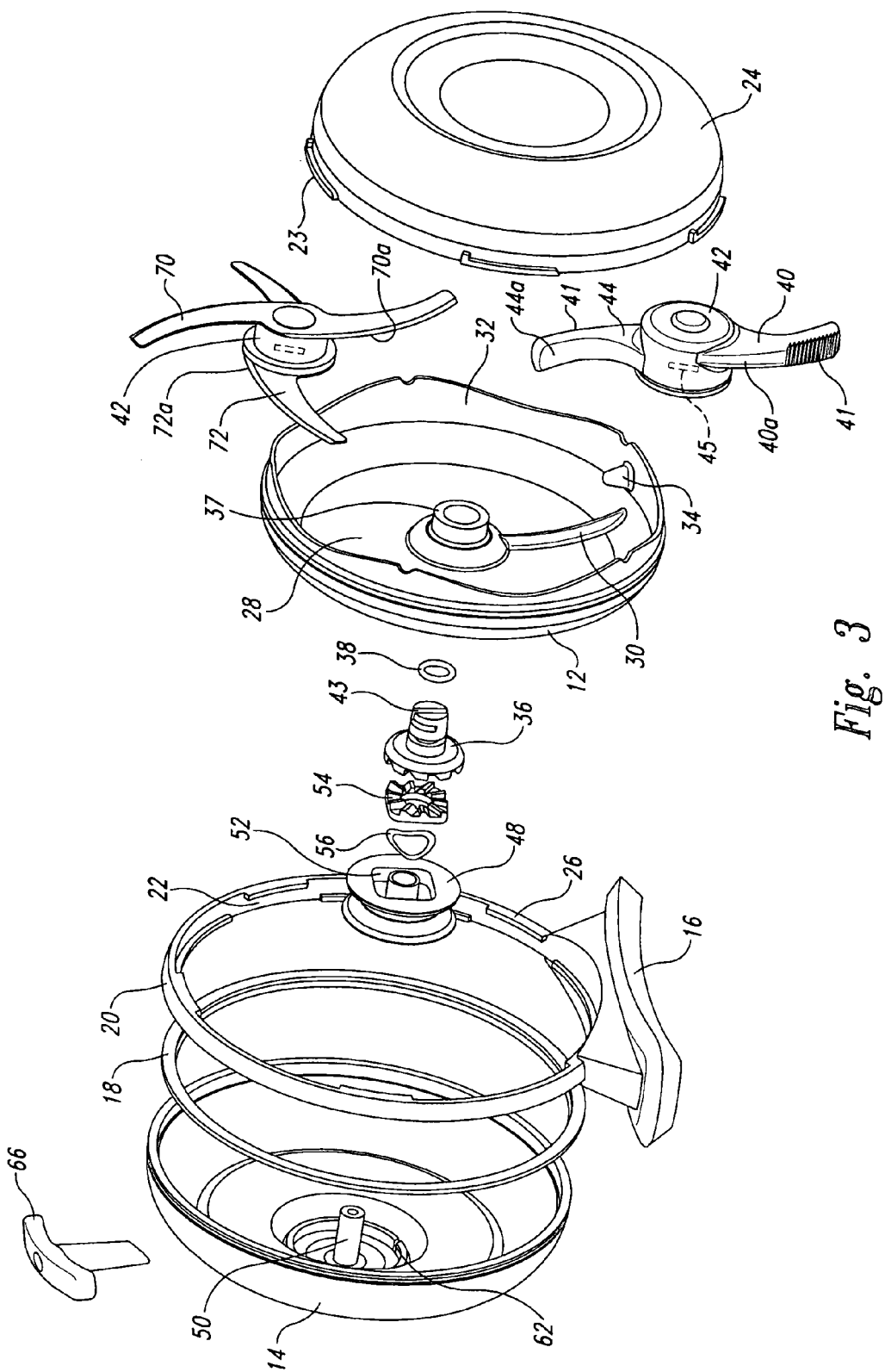
FIG. 3 is an exploded view of the food processor.

An arm 40 is attached to a hub 42. A second arm 44 axially spaced from the first arm is also attached to the hub. The first arm that lies closer to the widest part or center of the cup and cover is slightly longer than the second arm. The arms have ends 40a and 44a (FIG. 3) that are spaced closely from the stop block 34. The arms are generally convex on their forward surface in plan view and each has a forward facing roughened surface 41 in the direction of rotation of the arms. In FIG. 3, the roughed surface is transverse grooves but other roughed or textured surfaces can also be used. The elastomeric material itself can be of a sticky type. The purpose of the forward facing surfaces is to engage the skin of the food to be peeled, such as garlic cloves, and rub against the skin to dislodge it from the garlic clove. The stop block 34 serves to stop the garlic from freely spinning around in the cup. The long rib 30 also tends to hold the garlic and allow the arms to rub against the garlic so held by the rib.

Figure 4:
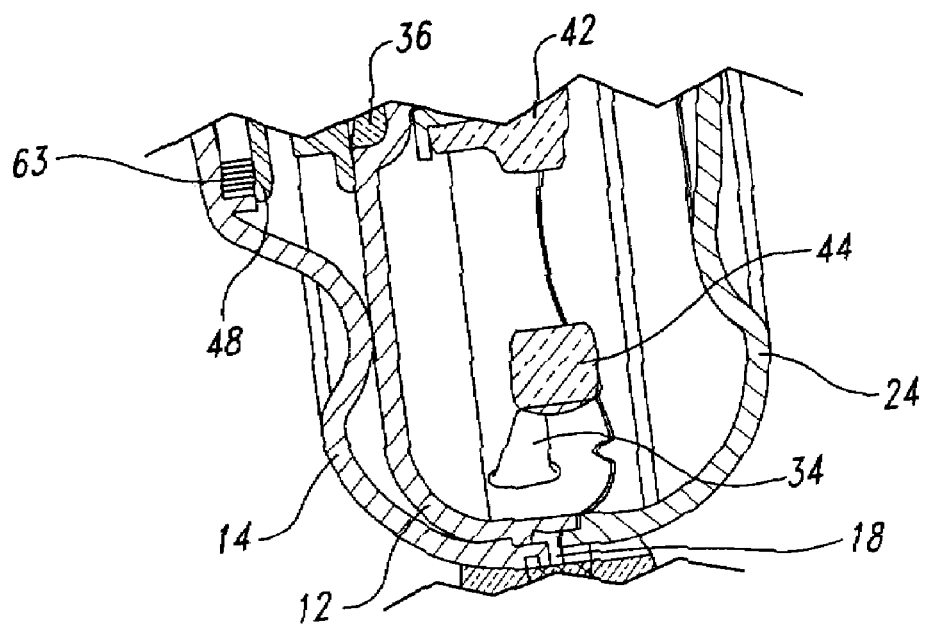
FIG. 4 is a partial fragmentary section of another embodiment showing the food processor without a long rib.

The action of the arms or only one arm, such as arm 44, can successfully peel garlic but the use of two arms provides improved and more effective peeling action. The long rib 30 is also not essential, as shown in FIG. 4, but the use of this rib also speeds up the peeling action. When a rib 30 is used the gap between the top of the rib 30a and the confronting surfaces 40b or 44b of the arms 40 and 44 is preferably between 0.050 and 0.150 inches. Thus, the preferred peeler is to have two arms 40 and 44, the long rib 30, and the stop block 34 but is should be understood that the invention encompasses the use of only one arm and without a long rib on the end surface of the food holder. It is also believed that even the stop block can be eliminated if the arms are used in an electrically powered food processor. When the power is manual, the shorter period for peeling is more important than if the power to rotate the drive shaft is an electric motor that can run for a longer period of time. The elastomeric arms are made of a flexible elastomeric material having a durometer of between Shore A 60 and Shore A 100 and preferably a durometer of between Shore A 80 and Shore A 82.

Figure 5:
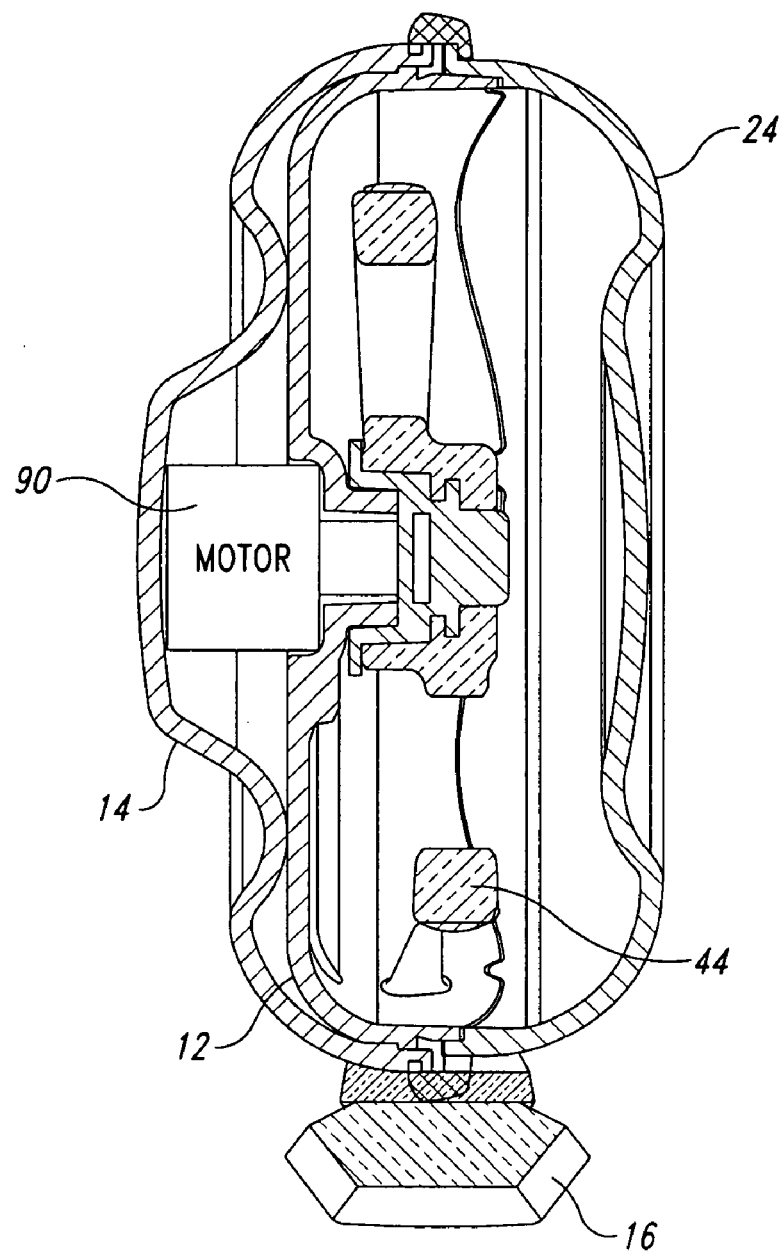
FIG. 5 is an other embodiment showing the food processor schematically with a conventional battery or other electrical motor drive.

The propulsion for the drive shaft is a unique manually powered pull cord motor having a pulley 48 rotatably mounted on a post 50. The pulley has a square recess 52 in which is fitted a toothed ratchet wheel 54. The ratchet wheel is biased outwardly (to the right in FIG. 3) by a disc spring 56. The teeth of the ratchet wheel mesh in a driving direction with mating teeth in the drive shaft 36. But reverse rotation of the pulley allows the teeth of the ratchet wheel to slide past the teeth of the drive shaft. The pulley has a slot 60, the housing has a slot 62, and a coiled strip spring 63 has its ends fitted in the slots, in a well know manner, and provides the return rotation to the pulley. Thus, the unidirectional rotational motion of the drive shaft is accomplished in the hand-powered version of the food processor by a pull cord 65 having several wraps around the pulley. The pull cord has a handle 66. The advantage of this pull cord type of rotational drive or motor is that the elastomeric arms are run at a high torque and at a high velocity (over 500 rpm) for several revolutions (about 5 or 6) from each pull of the handle 66. These rotations are for a relatively long rotational period. The arms have little mass and thus will stop prematurely when engaging the food in the processor unless the pull cord type of motor applies the high torque and long duration of rotation. Of course, an electrically powered drive motor, as shown in FIG. 5, can have a high torque and a long period of rotational power so the duration of rotation, high torque, and velocity needed in a hand-powered motor is less important for an electrically powered motor.

While the invention has been described as a peeler, the food processor can also be used as a chopper. However, it should be understood that the peeler version has utility and purpose either alternatively with the chopper or as an independent peeler. The chopper utilizes rigid arms 70 and 72 having sharpened forward facing cutting blades 70a and 72a. The chopper arms are also attached to a hub 42 that can also be drivingly and removably engaged with the drive shaft 36. When used as a chopper the rib 30 has the additional function of deflecting the cut or chopped food so that it gets thrown up again into the path of the rotating chopping blades. This function helps to speed up the cutting action and causes the food to be cut into smaller and smaller pieces. The combination of the stop block and the long rib creates a shearing action with the blades to increase the chopping speed and creates more uniformly smaller chopped pieces.

The chopper can also be used as a mixer and has been found to rapidly mix oils and vinegars or other salad dressing ingredients in small quantities. The chopper has been found to emulsify the oil and vinegar to better blend the dressing.

In the one form of the chopper or peeler the processor comes with both chopper blades and with peeler arms so that they can be used interchangeably. Thus, a user can peel garlic, then after removing the skins from the food holder, add other foods and further chop the peeled garlic, and chop the other added foods. A dressing can then be blended for a small salad ready to serve.

FIG. 5 shows the food processor but with a battery powered, unidirectional electric motor 90 substituted for the pull cord motor and one way drive.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A hand-powered, hand-held food processor compromising;
   a cup for holding the food to be processed and having a rotatable drive shaft;
   a food processing arm removably drivingly engaged to the drive shaft,
   a cover removably mounted on the cup;
   a hand-powered motor for driving the drive shaft, the hand-powered motor having a one way drive transmission, a pulley connected to the drive transmission, a pull cord having multiple wraps encircling the pulley whereby a pull on the pull cord by the user will rotate the pulley and thus the drive shaft for a long duration at a high one way rate of speed, and a return spring for retracting the extended pull cord to its original multiple wraps around the pulley.

2. The food processor of claim 1 wherein the cup has an axial end surface, a long rib attached to the axial end surface for temporarily holding food in the food processor from moving around the cup, and said food processing arm is an elastomeric flexible arm connected to the spindle whereby rotation of the spindle will move the elastomeric arm past the horizontal rib to rub the skin off of the food to be processed while the food is held by the horizontal rib.

3. The food processor of claim 2, the elastomeric arm having a lower end, the horizontal rib having an upper end, and wherein the space between the elastomeric arm lower end and the horizontal rib upper end rib is no greater than about 0.050–0.150 inches so that the food is simultaneously engaged between the arm and the rib.

4. The food processor of claim 3 wherein the elastomeric arm is made of a material that has a durometer in the range of Shore A 80 and Shore A 82.

5. The food processor of claim 2 wherein the elastomeric arm is made of a material that has a durometer in the range of Shore A 60 and Shore A 100.

6. The food processor of claim 2, said elastomeric arm having a roughened forward surface gripping the skin of the food being held by the horizontal rib to enhance the peeling action of the arm and rib.

7. The food processor of claim 1 wherein the cup has a cylindrical side surface, a stop block connected to the side surface for impeding the free movement of the food to be processed causing the food to be deflected into the path of the food processing arm.

8. The food processor of claim 7 wherein the food processing arm includes a forward facing sharpened blade for chopping the food in the cup.

9. The food processor of claim 8, including a second blade spaced axially from the first blade, the stop block being located between the two blades and radially outward from the two blades.

10. The food processor of claim 7 wherein the cup has an axial end surface, a long rib attached to the axial end surface for temporarily holding food in the food processor from moving around the cup, and said food processing arm is an elastomeric flexible arm connected to the spindle whereby rotation of the spindle will move the elastomeric arm past the horizontal rib to rub the skin off of the food to be processed while the food is held by the horizontal rib.

11. The food processor of claim 1, said drive transmission including a ratchet wheel having a plurality of evenly circumferentially spaced drive teeth, a drive shaft having a plurality of evenly circumferentially spaced driven teeth engageable by the teeth on the ratchet wheel to rotate the drive shaft, and a disc spring between the ratchet wheel and the drive shaft to allow the ratchet wheel to reverse its direction out of driving engagement with the drive shaft.

12. The food processor of claim 1, said cup housed in a drive housing, the drive housing holding the pulley, and portion of the pull cord entrained around the pulley, the housing having a gasket and a locking collar, the locking collar having a plurality of circumferentially spaced locking grooves, the cover having a plurality of depending ribs, the ribs adapted to fit into the grooves to lock the cover over the cup.

13. The food processor of claim 1 wherein the cup has a cylindrical side surface, a stop block connected to the side surface for impeding the free movement of the food to be processed causing the food to be deflected into the path of the food processing arm and said food processing arm is an elastomeric flexible arm connected to the drive shaft whereby rotation of the drive shaft will move the elastomeric arm against the food to be processed to rub the skin off of the food to be processed.

14. The food processor of claim 13 wherein the elastomeric arm has a roughened forward facing surface in the direction of rotation.

15. The food processor of claim 14 wherein the elastomeric arm roughened surface facing forward in the direction of rotation is textured.

16. The food processor of claim 13 wherein the elastomeric arm has a sticky surface facing forward in the direction of rotation.

17. The food processor of claim 1 wherein the food processing arm is elastomeric and flexible and has a roughened surface facing forward in the direction of rotation.

18. The food processor of claim 1, said drive transmission having a ratchet member having circumferentially spaced teeth, a drive shaft having mating teeth to engage the teeth on the ratchet member in one direction of rotation but slide over the teeth in the opposite direction of rotation, a disc spring urging the ratchet teeth lightly into engagement with the spindle shaft teeth.

19. The food processor of claim 18, including a second arm axially spaced from the first arm, the forward facing surfaces of the arms being sharpened blades.

20. A food processor for peeling food products having a removable skin, such as garlic cloves, the food processor having a food holding cup, a rotatable flexible elastomeric arm, means for rotating the arm within the cup, said cup having a cylindrical sidewall and an end surface, further including a long rib on said end surface, a stop block on the sidewall for interrupting the free spinning rotating of food in the cup, whereby the food in the cup is rubbed by the rotating elastomeric flexible arm to rub the skin off the food to be processed.

21. The food processor of claim 20 wherein the arm has a durometer of between Shore 60 A (relatively soft) and Shore 100 A (relatively stiff).

22. The food processor of claim 21 wherein the arm has a durometer of between Shore 80 A and Shore 82 A.

23. The food processor of claim 20 wherein the means for rotating the arm is an electric motor.

24. The food processor of claim 20 wherein the means for rotating the arm is a manual pull cord motor.

25. The food processor of claim 20 wherein the elastomeric arm has a roughened forward facing surface in the direction of rotation.

26. The food processor of claim 25 wherein the elastomeric arm roughened forward surface is textured.

27. The food processor of claim 20 wherein the elastomeric arm forward surface is sticky.

28. The food processor of claim 26 wherein the texture is grooves spaced axially along the arm.

29. The food processor of claim 20 including a second elastomeric arm axially spaced from the first elastomeric arm, the stop block being located along the space between the two arms.

30. The food processor of claim 29 wherein each arm has a forward convex shape in plan view in the direction of rotation.

31. The food processor of claim 29 wherein the elastomeric arms each have a roughened forward facing surface in the direction of rotation, and wherein the arm has a durometer of between Shore 60 A (relatively soft) and Shore 100 A (relatively stiff).

32. The food processor of claim 31 wherein the arms have a durometer of between Shore 80 A and Shore 82 A.

33. The food processor of claim 31 wherein each arm is convex in plan view in the direction of rotation, and the length of one of the arms is longer than the other arm.

34. A food processor for peeling food products having a removable skin, such as garlic cloves, the food processor having a food holding cup with a cylindrical sidewall, a rotatable flexible elastomeric arm, a manual unidirectional pull motor drive for rotating the arm within the cup, and a stop block on the sidewall for interrupting the free spinning rotating of food in the cup, whereby the food in the cup can be rubbed by the rotatable flexible elastomeric arm when it rotates, to rub the skin off the food being processed.

* * * * *